May 30, 1950

J. B. MILES 2,509,740

PROCESS FOR PRODUCTION OF NYLON
OF LOW THERMOEXTENSIBILITY
Filed Nov. 3, 1942

INVENTOR.
John B. Miles
BY
Louis A. Wiebe
ATTORNEY

Patented May 30, 1950

2,509,740

UNITED STATES PATENT OFFICE 2,509,740

PROCESS FOR PRODUCTION OF NYLON OF LOW THERMOEXTENSIBILITY

John B. Miles, Wilmington, Del., assignor to E. I. du Pont de Nemours & Company, Wilmington, Del., a corporation of Delaware Application November 3, 1942, Serial No. 464,382

5 Claims. (Cl. 8—130.1)

This invention relates to new and improved filaments, yarns, cords and the like composed of a synthetic linear polymer. More particularly, this invention relates to the production of synthetic linear polymer filaments, yarns, cords and the like which have a very low "thermo-extensibility" factor.

This is a continuation-in-part of my co-pending application Serial No. 414,880, filed October 13, 1941 now abandoned.

The invention will be described with particular reference to nylon filaments, yarns, cords and the like. The term "nylon" is used here to generically designate the particular synthetic linear polyamides disclosed in Carothers U. S. Patents Nos. 2,130,948 and 2,071,253. Since, however, the other synthetic linear polymers disclosed in Carothers U. S. Patent No. 2,071,250 have characteristics similar to nylon, and since they may also be advantageously processed in accordance with the present invention, this application, in its broad aspects, relates to the processing of all cold-drawn synthetic linear polymers disclosed in the above-said Patent No. 2,071,250. The term "synthetic linear polymers" as used throughout the specification and claims is limited and restricted in scope to the specific synthetic linear polymers disclosed in said Patent No. 2,071,250.

It has recently been proposed to use cold-drawn nylon yarns, cords and monofils as strain-resisting, reinforcing elements in vulcanized rubber structures such as rubber tires, rubber belts, rubber hose and the like. (See Hoff Patent No. 2,273,200.) Nylon structures which have been cold-drawn to a residual elongation of 14% or less are considered to be completely cold-drawn since a subsequent cold-drawing operation will fail to substantially draw the same, i. e., permanently elongate the same with a higher degree of permanent orientation, to a substantially greater extent. In view of the exceedingly high tensile strength of completely cold-drawn filamentous nylon structures, it was expected that vulcanized rubber structures containing the same would be greatly superior to similar previously known rubber structures reinforced with cotton or high tenacity regenerated cellulose.

Vulcanized rubber structures reinforced with cold-drawn nylon yarns, cords and the like, although useful, did not have the high superiority expected of them. It has now been found that cold-drawn filaments, yarns and cords of nylon, as well as other synthetic linear polymers, have a permanent growth, or a permanent extensibility when under stress at high temperatures far below their melting point, for example, at temperatures of above 100° C. This characteristic of nylon, which in some respects appears to be different from yarn growth as heretofore referred to in the tire cord art with reference to cotton and rayon structures, will hereinafter be referred to as its thermo-extensibility. The thermo-extensibility of nylon is especially significant in truck tires. When a truck tire, containing a nylon reinforcing structure is run under heavy loads, the high temperatures developed together with the strains imposed thereon bring about a certain amount of permanent extensibility of said reinforcing structure.

The thermo-extensibility of nylon filaments, yarns, cords and the like is different from mere stretch. When a tire reinforced with nylon is inflated and put under load, there will be an initial stretch which is of little consequence in service since it can be calculated and compensated for. Thereafter, under strains at high temperatures, there is a tendency for the cord to extend, or elongate, progressively and permanently. In extreme cases, the tire will become too loose for the wheel and work its way off. Cracking of the tire tread will frequently occur because of this extension of the tire cord with a considerable diminishing of the life of the tire.

It is, therefore, an object of the present invention to provide a process and apparatus for producing cold-drawn filaments, yarns and cords composed of synthetic linear polymers which have a low thermo-extensibility.

It is a further object of this invention to treat cold-drawn filaments, yarns and cords composed of synthetic linear polymers to impart a low thermo-extensibility thereto.

It is another object of this invention to produce articles of manufacture which are subject to conditions of high temperature and high strains, said articles containing cold-drawn synthetic linear polymer filaments, yarns and cords having a low thermo-extensibility.

It is a more specific object of this invention to produce vulcanized rubber tires and similarly reinforced vulcanized rubber structures containing as strain-resisting, reinforcing elements cold-drawn nylon filaments, yarns or cords having a low thermo-extensibility.

It is also an object of this invention to produce cold-drawn synthetic linear polymer filaments, yarns and cords having low thermo-extensibility and also having a low elongation when stretched to the breaking point.

It is still a further object of this invention to provide a method and apparatus for decreasing the thermo-extensibility of cold-drawn synthetic linear polymer filaments, yarns and cords and at the same time increasing the modulus of elasticity thereof.

Other objects of the invention will appear hereinafter.

The objects of the invention may be accomplished, in general, by subjecting a filamentous structure comprising a synthetic linear polymer, in its completely drawn state, to the combined action of a swelling agent therefor and a stretching tension of sufficient magnitude to stretch the same at least 0.5% of its length, and removing said swelling agent while the structure is in said stretched condition. This treatment of the yarn or cord is carried out within a time period between 0.1 second and 8 hours. The so-treated filamentous structure (filament, yarn or cord) can then be incorporated as the strain-resisting, reinforcing element in a pneumatic tire or other article which in its use will be subjected to high stress and high temperatures.

The processing of filamentous nylon structures with a swelling agent under conditions of stretch is preferably applied to such structures which have previously been completely cold-drawn; i. e., cold-drawn to a residual elongation, or break elongation, of 14% or less. However, it is within the scope of the present invention to simultaneously completely cold-draw undrawn nylon structures while subjecting them to the action of a swelling agent, it being only necessary that the structure is subjected to the combined action of a swelling agent and a stretching tension of sufficient magnitude to stretch the same at least 0.5% of its completely drawn length, and then removing the swelling agent while the structure is in said stretched condition. It is furthermore immaterial whether the structure is placed under the stretch before application of the swelling agent, or if the swelling agent is applied to the structure before stretching the same.

For convenience of comparison, the thermo-extensibility of a filamentous nylon structure is measured at a temperature of 135° C. (the temperature of pneumatic tires under drastic conditions of operation), under a load of 1 gram per denier. The thermo-extensibility of a filamentous nylon structure under these conditions shall hereinafter, for purposes of comparison, be referred to as its "thermo-extensibility factor." This factor may be computed as follows:

Given lengths of a cold-drawn filamentous nylon structure are loaded with a load of 1 gram per denier and subjected to a temperature of 135° C. in a room maintained at 25.5° C. and a relative humidity of 50. The length of the structure is measured after 30 minutes exposure and again after 1000 minutes exposure. The thermo-extensibility factor is computed with the aid of the equation:

$$Tx = \frac{\frac{L_{1000} - L_{30}}{L_0} \cdot 100}{1.523^1}$$

wherein $Tx$ = thermo-extensibility factor
$L_{1000}$ = length of structure after 1000 minutes exposure
$L_{30}$ = length of structure after 30 minutes exposure
$L_0$ = length of structure at time of loading.

The numerical value of the thermo-extensibility factor for a yarn or cord will depend to a considerable extent on the twist and cord construction. In general, a highly twisted yarn or cord will have a higher thermo-extensibility factor than a similar untwisted yarn or cord. For convenience in comparing treated filaments, yarns, and cords with similar untreated structures, thermo-extensibility factor values, as given in the specification and claims, are based on determinations made on single filaments or no-twist yarns or cords. Such a comparison eliminates the effect of twist on the thermo-extensibility factor.

In determining the thermo-extensibility factor of twisted yarn structures, the twist is first removed before the yarn is subjected to the loading conditions.

The thermo-extensibility factor of an untreated yarn, as well as that of a yarn treated in accordance with the invention can readily be determined and from the two a measure of the improvement in thermo-extensibility can be obtained. A convenient method of expressing improvement in thermo-extensibility is in terms of per cent reduction of the thermo-extensibility factor, which is the difference between the thermo-extensibility factor of an untreated cold-drawn, filamentous structure and the thermo-extensibility factor of a structure similarly cold-drawn and then treated in accordance with the present invention, expressed in percentage of the thermo-extensibility factor of the untreated structure.

Several preferred embodiments of apparatus, suitable for use in accordance with the present invention, are illustrated in the accompanying drawings to which specific reference is made in the following detailed description.

Figure 1:
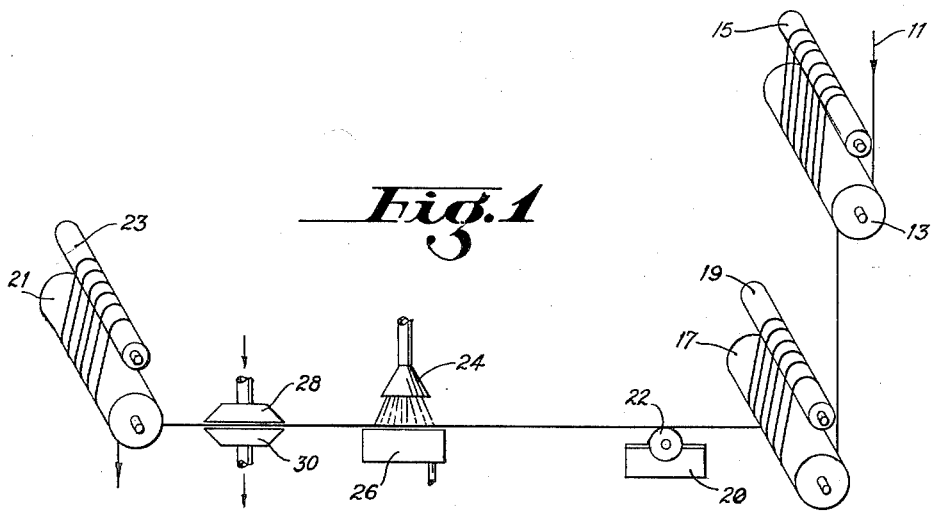
Figure 1 is a perspective view of a simple form of apparatus for treating a filamentous structure with a swelling agent while maintaining the same stretched, and then removing the swelling agent therefrom before releasing the stretching tension.

Referring to Figure 1 of the drawings, reference numeral 11 designates a yarn which is passed from any desired source successively about sets of drawing rollers 13—15, 17—19 and 21—23. Each set of drawing rollers comprises a drawing roller of comparatively large diameter and a separating roller of comparatively small diameter. In each set of drawing rollers, the axes of the two rollers are positioned at a slight angle to each other to cause a separation of the yarn helices and an advancement of the yarn along the rollers. The yarn is arranged with a sufficient number of turns about each set of drawing rollers to prevent slippage of the yarn thereon. The yarn passing from the drawing rollers 21—23 is collected in any desired manner such as by winding on a bobbin.

The yarn 11 may be an undrawn nylon yarn which is completely cold-drawn between rollers 13—15 and 17—19. The drawn yarn is then maintained under conditions of constant stretch between rollers 17—19 and 21—23. Between rollers 17—19 and 21—23, a swelling agent is applied to the yarn by means of applicator roll 22 rotating in a trough 20 containing a quantity of the swelling agent. The yarn 11 may, on the other hand, be a completely cold-drawn yarn which is stretched between the first two sets of drawing rollers and held under stretch for treatment between the second and third sets of drawing rollers. The swelling agent is removed from the yarn by washing the same with water or other solvent for the swelling agent passing from spray means 24. The spray is collected in catch basin 26. The yarn is then dried by means of air draft means 28 and 30. The swelling agent will be removed from the yarn before passing drawing rollers 21—23,

---

[1] $1.523 = \log 1000 - \log 30$.

and therefore before release of the stretch tension.

If the yarn to be treated is in the completely drawn state it may be stretched and treated between only two sets of drawing rollers. Drawing rollers 13—15 may under such circumstances be omitted from the apparatus shown in Fig. 1.

Figures 2, 3:
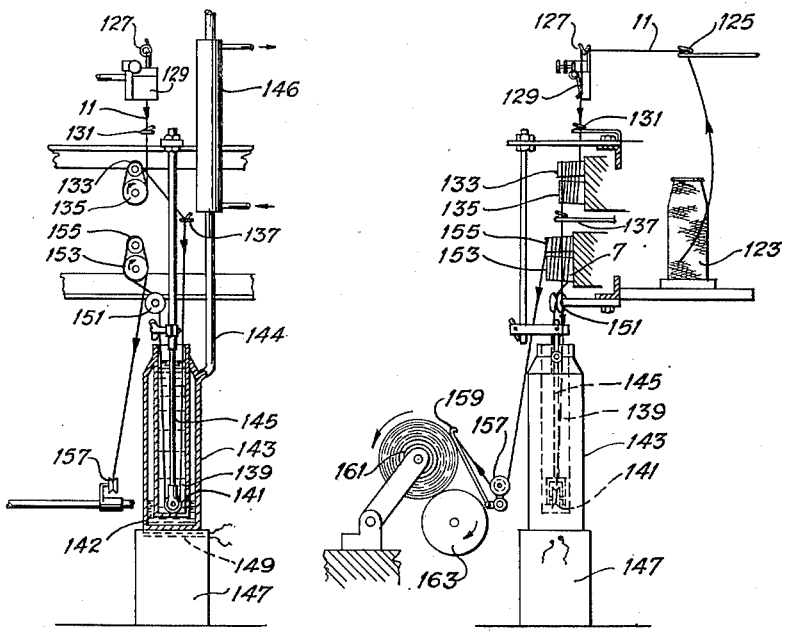
Figure 2 is a front elevational view, with parts shown in section, of a modified form of apparatus constructed in accordance with the invention.
Figure 3 is a side elevational view of Figure 2 and showing also a winding means for the treated yarn.

Referring to Figures 2 and 3 of the drawings, the yarn 11 is passed from pirn 123 through yarn guide 125 and 127 and tensioning device 129 and then with a plurality of turns about a set of draw rollers 133—135. From draw rollers 133—135, the yarn is passed through guide 137 and about roller yarn guide 141. Roller yarn guide 141 is positioned within a heated swelling agent, such as water or dilute aqueous phenol solution, in well 139 of heater 143. The guide 141 is positioned on the end of a retractable supporting rod 145. The swelling agent may be maintained at an even heat by a constant temperature boiling liquid 142 in a jacket surrounding the well 139. The liquid is maintained at boiling temperature by means of an electrical resistance element 149 in heater 147. The volatilized liquid 142 passes through conduit 144 to condenser 146 where it is condensed and flows back into the jacket.

The yarn passes from roller guide 141 to roller guide 151, then about a second set of draw rollers 153—155. This second set of draw rollers is driven at a peripheral speed sufficiently greater than that of draw rollers 133—135 to impart a stretch to the yarn of at least 0.5% of its completely drawn length. If the yarn is undrawn, or partially drawn, it may be completely drawn between the two sets of draw rollers at the same time that it is being treated with the swelling agent, it being only necessary to regulate the relative speed of the draw rollers to impart to the yarn a stretch of 0.5% over its completely drawn length. The drawn and processed yarn is then passed about roller guide 157 and is wound on bobbin 161 with the aid of reciprocating traverse guide 159. Bobbin 161 may be driven in any desired manner, for example, by means of surface drive roller 163. The yarn must be wound on the bobbin with sufficient tension to keep the yarn stretched at least 0.5% of its completely drawn length since it still contains the swelling agent. The swelling agent must be removed from the tensioned yarn on the bobbin before the yarn is released. This may be done by simply drying the yarn on the bobbin if the swelling agent is water or similar volatile material. If the swelling agent cannot be removed by simple drying it may be necessary to wash the yarn while it is on the bobbin to remove the swelling agent, and then dry the yarn to remove the water or other substance used to wash the swelling agent therefrom. This must be done before the stretching tension on the yarn can be released. The bobbin of yarn may be washed in any desired manner, for example, by submersing the bobbin in the washing fluid, or by forcing the latter through the bobbin.

The following examples illustrate preferred methods of processing in accordance with the invention, but they are not to be considered as limitative of the invention.

If the yarn has previously been completely cold-drawn it can be conveniently processed in accordance with this invention by merely winding the same on a bobbin, or the like, with a tension sufficient to stretch the same at least 0.5% of its completely drawn length, and the yarn while wound on the bobbin then treated with a swelling agent, and removing the swelling agent from the yarn before it is removed from the bobbin.

EXAMPLE I

An 800-denier, 300-filament, completely cold-drawn polyhexamethylene adipamide yarn was wound on a bobbin under a tension of 2.5 grams per denier (about 10% stretch). The yarn and bobbin were immersed in a 4% aqueous phenol solution for 5 minutes, transferred immediately to a beaker of boiling water (100° C.) and left there for one hour. They were then taken from the water and stored for 24 hours in an oven maintained at 65° C. The boiling water and dry heat removed the phenol. The treated yarn has a thermo-extensibility factor of 0.09 representing a 74% reduction from that of an untreated control yarn, namely, a thermo-extensibility factor of 0.35.

EXAMPLE II

Two 800-denier, completely cold-drawn polyhexamethylene adipamide yarns were wound on separate aluminum bobbins under a tension of 3 grams per denier (about 12% stretch). The bobbins containing the stretched yarn were immersed for 15 minutes in a 4% aqueous solution of phenol at room temperature (about 25° C.). After removal from the phenol solution one of the yarns was removed from its bobbin while still wet. This yarn was skeined and then dried in the skein form at a temperature of 25.5° C. and a relative humidity of 70%. The other yarn while still held under tension on the bobbin was boiled in water for one hour and then dried for 24 hours in the atmosphere at a temperature of 65° C. The tenacity, elongation and thermo-extensibility factor of these two yarns are shown in the following table which also shows comparable values for a control yarn which was completely cold-drawn but not subjected to treatment with a swelling agent under tension.

*Table I*

| Yarn | Denier | Tenacity, g/d. | Elongation at Break, Per Cent | Elongation 1.86 g/d. Per Cent | Thermo-extens. Factor |
| --- | --- | --- | --- | --- | --- |
| Control | 438 | 5.8 | 14.7 | 5.9 | 0.6 |
| Skein-dried | 935 | 5.0 | 17.5 | 10.4 | 0.59 |
| Boiled-off and dried under tension | 840 | 5.9 | 10.7 | 5.3 | 0.21 |

The above results clearly show the necessity for removal of any swelling agent while the yarn is maintained under tension. The skein-dried phenol yarn is no better than the untreated control yarn from a standpoint of thermo-extensibility, and is actually inferior from a standpoint of tenacity and elongation.

EXAMPLE III

A 475-denier, 156-filament nylon yarn, prepared from polymer having a viscosity of between 3,000 and 4,000 poises, was drawn approximately 460%, twisted 1½ turns per inch and wound on a bobbin under a tension of 3 grams per denier (about 12% stretch). The yarn, while maintained under this tension, was immersed in water at 25° C., thereafter removed from the water and dried prior to relaxation. The characteristics of the resulting yarn, as compared with a completely drawn but untreated control yarn are shown in Table II, below.

As shown in Table II, the treated yarn is superior to the untreated yarn in thermo-extensibility characteristics. The yarn so produced will be readily usable in a pneumatic tire and will have a low thermo-extensibility factor at the temperature of tire operation (135° C.).

swelling agent used. In the case of water it is sufficient if it be reduced to 6%, preferably 4.5%, however, in the case of phenol it is necessary to reduce the content to 1.0% and preferably to 0.5%, based on the weight of the yarn.

In applying the swelling agent to the yarn it is preferred to substantially saturate the yarn with the swelling agent, however, smaller quantities may be applied to the yarn by spraying, roller application or the like. To obtain valuable results in accordance with the invention it is necessary to apply sufficient swelling agent to impart a substantial swelling action thereto. For example, water will impart a material swelling Table II

| Windup Tension in g./d. | Time of Treatment with Water at 25° C. | Drying Time and Temp. | Denier | Tenacity in g./d. | Elongation at— | | Thermo-extens. Factor | Reduction of Thermo-extens. Factor in percent |
|---|---|---|---|---|---|---|---|---|
| | | | | | Break, percent | 1.86 g./d., percent | | |
| 3.0 | (Control untreated) | | 475 | 6.4 | 12.7 | 5.5 | 0.52 | 0 |
| 3.0 | 5 seconds | 10 min., 70° C., 50 R. H. | 470 | 6.0 | 10.8 | 5.8 | 0.22 | 58 |
| 3.0 | 10 seconds | 10 min., 70° C., 50 R. H. | 469 | 6.2 | 11.2 | 6.0 | 0.22 | 58 |
| 3.0 | 5 seconds | 24 hours at room temperature at 50 R. H. | 470 | | | | 0.21 | 60 |

The yarn, or other filamentous structure, may be treated with the swelling agent at substantially any temperature below the melting point of the synthetic linear polymer so long as substantial swelling of the yarn takes place. The yarn is treated with a sufficient quantity of the swelling agent and for a sufficient period of time to induce a material swelling thereof.

Any agent which will materially swell the yarn will be operative in accordance with the present invention. Some of the known swelling agents for synthetic linear polymers have a decided solvent action thereon. In such cases where the solvent action is sufficiently strong to degrade the yarn during treatment it will, of course, be necessary to dilute the solvent with a sufficient quantity of a diluent such as water or alcohol to prevent material yarn degradation under the treating conditions. As examples of swelling agents which may be used in accordance with the invention, the following may be mentioned:

Acetic acid
Benzoic acid
Benzene sulfonic acid
Aniline
Aliphatic alcohols
Diacetone alcohol
Polyhydric alcohols
Nitro alcohols
Chlorinated hydrocarbons-methanol
Calcium chloride-methanol
Dimethyl formamide
Ethylene chlorohydrin
Methanol-chloroform
Methanol-1 chloro,2,2'dichloroethane
O-cresol
Resorcinol
Aminophenol
Alkylated phenols
Dihydroxy and trihydroxy phenols
Salicylic acid It is not necessary that every particle of swelling agent be removed from the filamentous structure. It is sufficient if it be removed to such extent that it no longer has a material swelling effect on the structure. The permissible amount of swelling agent which may be left in the yarn will depend to a large extent upon the particular to the yarn if present in an amount exceeding 10%, based on the weight of the yarn, whereas with a 4% aqueous phenol solution the presence of 5%, or more, of the solution, based on the weight of the yarn, will impart a substantial swelling action thereto. The presence of a swelling agent in sufficient amount to swell the yarn an amount equivalent to the presence therein of 10% or more of water will be sufficient for operativeness in accordance with the present invention.

In the swelling agent conditioning treatments described above, it is important for the yarn to be conditioned while it is held in a stretched condition. By so doing, changes in the crystal structure which result in the production of yarn having low thermo-extensibility characteristics are brought about.

Filaments, yarns and cords produced in accordance with the methods of the present invention have an average thermo-extensibility factor of 0.3 or less.

Filaments, yarns and cords having an average thermo-extensibility factor of 0.3 or less have great utility as strain-resisting, reinforcing elements in tires, belts, hose and similar structures which are subjected to conditions of strain at relatively high temperatures.

Previously known nylon yarns and cords, although superior from a standpoint of high strength and elasticity, were useful as reinforcing elements in tires and the like. However, due to their relatively high thermo-extensibility they did not come into direct competition with other known tire reinforcing elements.

It is believed that the superiority of the filaments, yarns and cords of the present invention will lead to their use as reinforcing elements in tires and the like in direct competition to cotton and regenerated cellulose cords and yarns.

In the above-described processes, the stretch applied during the treatment will, of course, in all cases be less than that which would break the yarn or break a material number of filaments thereof. As above stated, the completely drawn yarns, i. e., yarns which have been drawn to a point where their residual elongation is 14% or less, are subjected to treatment while the yarn is stretched 0.5% to 40% of its drawn length.

This is essential whether the drawn yarn is subsequently treated or whether it is treated during the drawing thereof. The preferred method of the present invention comprises the stretching of the yarn as much as possible without breaking it and treating the same while so stretched. Obviously, the stretch that can be introduced will depend to a great extent on the type of synthetic linear polymers of which the yarn or cord structure is composed, the spinning conditions under which the structure was produced, the extent to which the yarn was previously cold-drawn, etc. In the case of completely cold-drawn polyhexamethylene adipamide yarns, cords and the like, it is preferred that they be stretched between 0.5 and 20% of their completely drawn length when they are subjected to the treatment of this invention. It is clearly within the ability of anyone skilled in the art to determine the optimum stretching conditions for obtaining a yarn of any particular thermo-extensibility factor.

In connection with the present invention, it has been found that if the yarn or cord structure is stretched to at least 3% of its completely drawn length a very desirable reduction of break elongation and an increase in modulus of elasticity of the structure will result. It will be seen from the examples that a stretch of about 10% imparts these desirable characteristics to the cord. In general, it is desirable to produce yarns by the process of this invention which will have a break elongation of less than 14% and preferably between 8% and 14%.

Reference is also frequently made to the elongation at 1.86 grams per denier. This is done because it has been found that the performance of a tire in use does not depend on the elongation at break of the yarn constituting the strain-resisting elements but rather on the elongation at the working stress, which is generally about 1.86 grams per denier. This corresponds to the elongation at about 10 pounds load on a 2500-denier cord, which is a test frequently applied in the pneumatic tire making art. The elongation at 1.86 grams per denier is sometimes termed the "stretch-ability" or "ease of stretching" since it represents the amount a yarn can be stretched with a given load. The yarn products of this invention have low stretchability as compared to prior nylon yarn. In general, it is desirable to treat yarns in accordance with the process of this invention until they have an elongation at a load of 1.86 grams per denier of below 5% and preferably between 3.5% and 5%.

A low value for the elongation at a given load, for example, at a load of 1.86 grams per denier, means that the yarn has a high modulus of elasticity since the modulus of elasticity is inversely proportional to the elongation at a given load. The modulus of elasticity expressed in grams per denier required to produce 1% stretch can be readily computed from the stress-strain curve for a given yarn or it may be roughly computed by dividing 1.86 grams per denier by the elongation at that load. The stress-strain measurements from which the modulus of elasticity values given herein are taken were made on a Scott tester. The modulus in grams per denier required to produce a 1% stretch was calculated from the load required to produce a 3% stretch, but the stress-strain curves for these yarns are, in general, substantially linear from zero stretch up to and somewhat above 3% stretch. In general, it has been found desirable to treat yarns in accordance with this invention until the modulus of elasticity has been increased at least 5% up to 100% or even higher.

The swelling substance may be removed by other methods than by leaching with boiling water and heating with dry heat; for example, they may be removed by extracting with alcohol, dilute caustic or any other solvent or reagent capable of removing the substance providing it has no deleterious effect on the nylon.

The low thermo-extensibility factor filaments, yarns, cords, and the like of the present invention are of particular utility as strain-resisting, reinforcing elements for rubber structures such as pneumatic tires, belts, hose and the like. They have general utility in all cases where permanent elongation due to heat and strain is objectionable. The filamentous structures of the present invention may be coated with any desirable coating materials for the production of structures resistant to thermo-extensibility. They may, for example, be coated with neoprene, phenol-formaldehyde resins, vinyl resins, polyvinyl alcohol, vinyl chloride-vinyl acetate copolymers, vinylidene chloride polymers and copolymers thereof with vinyl chloride, methyl methacrylate resins, pyroxylin, cellulose acetate, and other plastic materials.

The filamentous structures can be adhered to rubber by any of the known adhesives, for example, resin-latex adhesives used for adhering rayon to rubber. They may also be adhered to rubber by means of a diisocyanate or diisothiocyanate as disclosed in the copending application of the Herndon application Serial No. 403,765, filed July 23, 1941, now Patent No. 2,439,514.

The synthetic linear polymers, used for the manufacture of the yarns, cords or like structures of the present invention, may contain addition agents such as antioxidants, heat stabilizers, anti-embrittlement agents, such as phenyl-alpha-naphthyl amine, beta-naphthyl amine, diphenyl guanidine and phenothiazine, fillers, plasticizers, etc.

The filamentous structures of the present invention, when used for strain-resisting, reinforcing elements for tires, are preferably made in the form of a single bundle of filaments containing no twist, or containing only sufficient twist to hold the filaments together. On the other hand, it is within the scope of the present invention to make rubber reinforcing cords in the form of plied and cabled structures. Such plied and cabled structures may contain any desired twist but preferably contain only sufficient twist in the thread, strand or cable to hold the structures together.

Due to the remarkable flexibility and elasticity of these filaments, comparatively large filaments can be used and it is a matter of no importance whether or not all the filaments become intimately associated with the rubber. It is, in fact, possible to use, as the reinforcing elements for tires and the like, fabrics constructed of individual separate exceedingly large filaments called mono-fils, instead of multi-filament cords. The mono-fils may be 10 denier, or even lower, and up to 1000 denier, or even larger.

Although the products of this invention have been described in terms of their characteristics before being incorporated in a tire or other article, it is to be understood that these characteristics also apply to the filaments, yarns or cords after careful removal from a tire or other article.

The use of the filaments and yarns of this invention in combination with other textile yarns, such as cotton, regenerated cellulose, etc., is not precluded although best results are obtained by using nylon alone.

While the examples have been described in terms of nylon filaments and yarns prepared from polyhexamethylene adipamide; however, they are not so limited. For example, nylon filaments and yarns prepared from polyhexamethylene sebacamide, polydecamethylene sebacamide, 6-aminocaproic acid polymer, and other polyamides such as disclosed in U. S. Patents Nos. 2,130,948 and 2,071,253 may also be processed in accordance with the invention. It is to be understood that filaments prepared from other synthetic linear polymers than synthetic linear polyamides may also be treated in accordance with the invention. These synthetic linear polymers include besides the polyamides, the polyesters, polyethers, polyacetals, mixed polyester-polyamides, etc., which, for example, may be prepared by a process of condensation polymerization as described in U. S. Patent No. 2,071,250. As above stated, the processing of structures in accordance with the invention must be carried out below the melting point of the yarn. Therefore, different temperature ranges for the heat treatment will be required for different polymers depending upon their melting points.

By the practice of this invention, it is possible to produce tires of remarkable strength and durability. Because of the great strength and good bending and tensile elasticity of these synthetic polyamide filaments, it is possible to use cords of much lower denier and having little or no twist. Because of this reduction in denier, it is possible to make much lighter and thinner tires. Similarly, if cords of the same denier are used, lighter and thinner tires having the same strength as previously known tires can be produced by reason of fewer plies, thereby also permitting the construction of tires with less rubber. Moreover, since during the vulcanizing step, the nylon filaments tend to adjust themselves to the non-uniform stresses, in the final tire all are resisting strain uniformly. The usual safety factor commonly employed may be substantially reduced with consequent further diminutions in the amount of nylon required per unit of rubber for a given load. This reduction in thickness and weight of the tire not only reduces the centrifugal forces to which it is subjected and reduces the cost of construction, but it also decreases the heat produced upon the flexing of the tire and in turn increases the rate of dissipation of the heat.

This invention makes possible tire cords having a low elongation both at breaking stress and at the working stress, which is, generally speaking, about 1.86 grams per denier. This is most desirable in a tire cord, as previously pointed out. Nylon yarns for tire cords having elongations at a load 1.86 grams per denier of 25% less than the best known prior nylon yarns for tire cords are made possible by the invention. Break elongation of 30% less than that of the best previously known nylon yarns is made possible.

This invention also makes possible nylon filaments, yarns, and cords of high tenacity, which is a very desirable attribute of cords for use in tires as well as for many other purposes.

Because of high inherent elasticity of these filaments, it is possible to eliminate high twist; this results in more flexible cords and likewise more flexible tires containing such cords. Similarly, this reduction in twist results in a saving because the usual twisting, plying, cabling and other similar operations may be eliminated, and the yarn or filaments may be incorporated in the tire directly from the package received from the manufacturer of the yarn or cord. The reduction in twist also is helpful in obtaining an integral structure since the rubber penetrates the yarn and tends to become intimately associated with each filament, thus resulting in good bonding.

Because of the high resistance to permanent deformation, the wide elastic limits of these polyamide yarns, and their tendency to show a very low "plastic flow," it is possible to produce rubber tires and like products according to the invention which show remarkably small growth due to thermo-extensibility of the reinforcing elements.

Other improved products containing filaments, yarns and cords treated in accordance with this invention include power transmission belting, parachute cords and fabrics, airplane fabrics, balloon cloth, bristles for general use, fishing leaders, sewing thread, shower curtains, umbrellas, etc.

Since it is obvious that many changes and modifications can be made in the details above-described without departing from the nature and spirit of the invention, it is to be understood that the invention is not to be limited to these details except as set forth in the appended claims.

I claim:

1. The process of reducing the thermo-extensibility of a filamentous structure comprising a synthetic linear polymer which comprises subjecting said structure to the action of a swelling agent therefor, while the structure is being drawn to a residual elongation not to exceed 14% and is being stretched at least 0.5% beyond its completely drawn length and removing said swelling agent until it no longer has a material swelling effect on said structure while the structure is in said stretched condition.

2. The process of claim 1 in which said polymer is nylon.

3. The process of claim 1 in which said polymer is polyhexamethylene adipamide.

4. The process of claim 1 in which said swelling agent is water.

5. The process of claim 1 in which said swelling agent is an aqueous solution of phenol.

JOHN B. MILES.

REFERENCES CITED

The following references are of record in the file of this patent:

UNITED STATES PATENTS

| Number | Name | Date |
|---|---|---|
| 2,137,235 | Carothers | Nov. 22, 1938 |
| 2,157,117 | Miles | May 9, 1939 |
| 2,157,119 | Miles | May 9, 1939 |
| 2,197,896 | Miles | Apr. 23, 1940 |
| 2,214,442 | Spanagel | Sept. 10, 1940 |
| 2,226,529 | Austin | Dec. 31, 1940 |
| 2,251,508 | Watson | Aug. 5, 1941 |
| 2,273,200 | Hoff | Feb. 17, 1942 |
| 2,285,967 | Hardy | June 9, 1942 |
| 2,291,873 | Brubaker | Aug. 4, 1942 |